(12) United States Patent
Frank et al.

(10) Patent No.: US 7,367,179 B2
(45) Date of Patent: May 6, 2008

(54) METHOD AND DEVICE FOR OPERATING AN INTERNAL COMBUSTION ENGINE HAVING A CATALYTIC CONVERTER

(75) Inventors: Michael Frank, Vaihingen/Enz (DE);
Torsten Huppertz, Ludwigsburg (DE);
Claus Wundling, Freiberg A.N. (DE);
Daniel Scherrer, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/232,783

(22) Filed: Sep. 21, 2005

(65) Prior Publication Data
US 2006/0064967 A1   Mar. 30, 2006

(30) Foreign Application Priority Data
Sep. 21, 2004   (DE) .............. 10 2004 045 540

(51) Int. Cl.
*F01N 3/00*   (2006.01)
(52) U.S. Cl. .................. 60/284; 60/274; 60/286; 60/298; 60/303; 123/142.5 E

(58) Field of Classification Search ............ 60/274, 60/284, 286, 298, 300, 303, 320; 123/142.5 E
See application file for complete search history.

(56) References Cited

U.S. PATENT DOCUMENTS

| | | | | |
|---|---|---|---|---|
| 5,323,868 A | * | 6/1994 | Kawashima | 180/65.4 |
| 5,428,955 A | * | 7/1995 | Yuuki et al. | 60/276 |
| 5,601,061 A | * | 2/1997 | Dam et al. | 123/298 |
| 5,727,384 A | * | 3/1998 | Ma | 60/284 |
| 5,966,931 A | * | 10/1999 | Yoshizaki et al. | 60/284 |
| 6,523,342 B2 | * | 2/2003 | Kuper et al. | 60/300 |
| 6,594,990 B2 | * | 7/2003 | Kuenstler et al. | 60/295 |
| 6,912,845 B2 | * | 7/2005 | Hirooka | 60/285 |
| 7,007,460 B2 | * | 3/2006 | Frieden et al. | 60/284 |

* cited by examiner

*Primary Examiner*—Binh Q. Tran
(74) *Attorney, Agent, or Firm*—Kenyon & Kenyon LLP

(57) ABSTRACT

A method and a device for operating an internal combustion engine having a catalytic converter are described making it possible to heat the catalytic converter more quickly. An additional load of the internal combustion engine is applied to heat the catalytic converter.

2 Claims, 3 Drawing Sheets

METHOD AND DEVICE FOR OPERATING AN INTERNAL COMBUSTION ENGINE HAVING A CATALYTIC CONVERTER

FIELD OF THE INVENTION

The present invention is directed to a method and a device for operating an internal combustion engine having a catalytic converter.

BACKGROUND INFORMATION

Much of the exhaust gas emissions in today's gasoline engines is produced during a cold start before the catalytic converter is ready for operation. To reduce exhaust gas emissions, the catalytic converter must be heated as quickly as possible. One way to do this is to operate the engine at an elevated idle speed to increase the exhaust mass flow rate and thus intensify the transfer of heat to the exhaust system. The engine is thus operated with a lean fuel/air mixture (lambda>1) to reduce the emission of uncombusted hydrocarbons. Retarding the ignition point after the top dead center deliberately lowers engine efficiency, which further increases the exhaust mass flow rate.

At a preset maximum acceptable idle speed for heating the catalytic converter, the maximum possible exhaust mass flow rate is limited by the maximum possible decrease in efficiency. This maximum possible decrease in efficiency is currently determined directly by the latest possible ignition angle. This means that increasing the exhaust mass flow rate at a preset idle speed is possible only by further retarding the ignition points, it being possible to continue delaying the ignition points only as long as the combustion of the fuel/air mixture in the combustion chamber of the internal combustion engine is still ensured.

SUMMARY OF THE INVENTION

The method according to the present invention and the device according to the present invention for operating an internal combustion engine having a catalytic converter have the advantage over the related art in that an additional load is applied to the internal combustion engine to heat the catalytic converter. This measure makes it possible to further decrease the efficiency of the internal combustion engine without influencing the running smoothness of the engine, i.e., without having to take into account any misfiring resulting from overly delayed ignition points. However, further decreasing efficiency by applying the additional load makes it possible to increase the exhaust mass flow rate and thus heat the catalytic converter more rapidly.

It is particularly advantageous if at least one glow plug that is installed in the cooling-water circuit of the internal combustion engine is used as the additional load. This enables the cooling water, and thus the internal combustion engine, to heat up more rapidly. The heat transferred to the cooling water by the glow plugs raises the internal combustion engine to the operating temperature more quickly and thus reduces fuel consumption during later startup.

Furthermore, when using multiple glow plugs as the additional load, it is advantageous to connect the glow plugs sequentially. This avoids abrupt loading of the electrical system of the internal combustion engine and thus prevents an electrical failure.

A further advantage is obtained by applying the additional load of the internal combustion engine for heating the catalytic converter only if a request to heat the catalytic converter is detected. By doing this, the decrease in efficiency caused by applying the additional load is limited to the heating of the catalytic converter so that the internal combustion engine may otherwise be operated at optimum efficiency.

The request to heat the catalytic converter may be generated particularly easily if the temperature of the catalytic converter is below a first preset threshold value.

It is further advantageous if the additional load of the internal combustion engine is applied to heat the catalytic converter only when a starting operation of the internal combustion engine has ended. This prevents the starting operation from being impaired, i.e., delayed, as a result of the application of the additional load, which in turn avoids elevated exhaust gas emissions.

It is further advantageous if the additional load of the internal combustion engine is applied to heat the catalytic converter only if a temperature of the internal combustion engine is below a second preset threshold value. This enables the temperature of the internal combustion engine to be used as an additional or alternative criterion for generating the request to heat the catalytic converter, since the temperature of the internal combustion engine usually correlates with the temperature of the catalytic converter.

It is furthermore advantageous if the additional load of the internal combustion engine is applied to heat the catalytic converter only if the internal combustion engine is in an idle mode. This ensures that adequate reserves for an output variable of the internal combustion engine are available outside the idle mode, in particular for starting the internal combustion engine, to guarantee the operation of the internal combustion engine. This advantage is also achieved by removing an applied additional load when the internal combustion engine leaves an idle mode.

DETAILED DESCRIPTION

Figure 1:
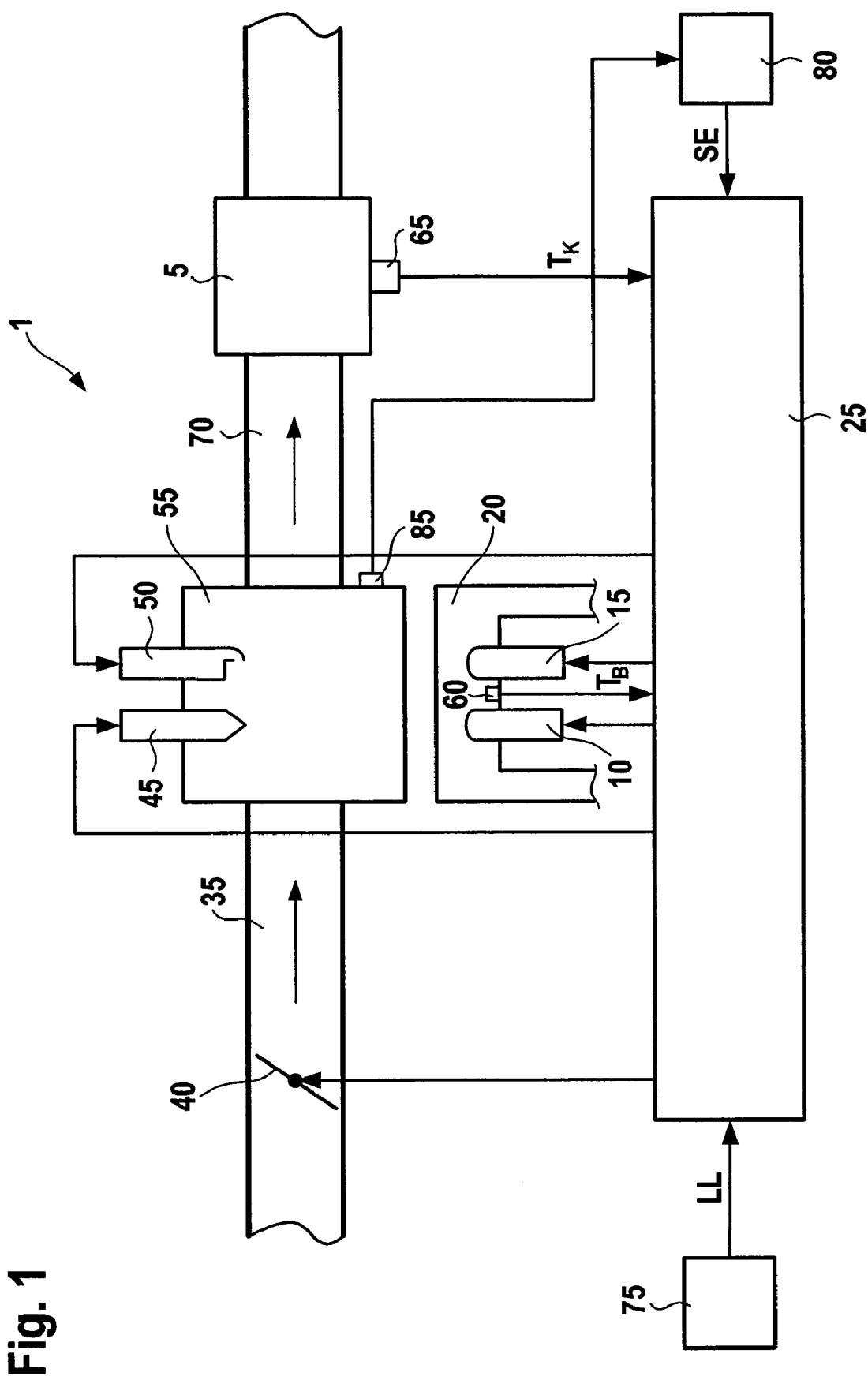
FIG. 1 shows a schematic view of an internal combustion engine.

In FIG. 1, reference numeral 1 designates an internal combustion engine that propels, for example, a vehicle. Internal combustion engine 1 may be designed, for example, as a gasoline engine or as a diesel engine. In the description below, it is assumed by way of example that internal combustion engine 1 is designed as a gasoline engine. A cylinder block 55 of gasoline engine 1 is supplied with fresh air via an air supply system 35. A throttle valve 40, which is driven by an engine controller 25 for setting a specific degree of opening, is provided in air supply system 35. The degree of opening of throttle valve 40 is presettable by engine controller 25 as a function of a driver request in the manner known to those skilled in the art, this driver request being specifiable by a degree of actuation of a gas pedal that is not illustrated in FIG. 1. Cylinder block 55 may include one or more cylinders. For the sake of simplicity, it is assumed in the description below that cylinder block 55 includes one cylinder. By way of example, therefore, it is assumed below that cylinder block 55 corresponds to this single cylinder. Thus, fuel is supplied to the combustion chamber of cylinder 55 via a fuel injector 45. The fuel may be supplied to cylinder 55 by direct injection, as shown in FIG. 1. Alternatively, the fuel is also injectable into air supply system 35 upstream or downstream from throttle valve 40 via fuel injector 45. Fuel injector 45 is also controlled by engine controller 25 in a manner known to those skilled in the art, for example to set a desired air/fuel mixture ratio. The fresh air supplied via air supply system 35 to the combustion chamber of cylinder 55 via an intake valve of cylinder 55 (which is not illustrated in FIG. 1) forms an air/fuel mixture together with the injected fuel in the combustion chamber of cylinder 55. The air/fuel mixture is ignited by a glow plug 50 in the manner known to those skilled in the art, glow plug 50 also being controlled by engine controller 25 to set a desired ignition point. The ignition point is specifiable by engine controller 25, for example as a function of a reserve to be set for an output variable of internal combustion engine 1, for example a torque or a power output. However, the ignition point may also be suitably specified, for example, to heat a catalytic converter 5 in an exhaust system 70 of internal combustion engine 1. In this case, the ignition point is retarded as far as possible. The exhaust gas resulting from the combustion of the air/fuel mixture in the combustion chamber of cylinder 55 is discharged into exhaust system 70 via an exhaust valve that is not illustrated in FIG. 1. The exhaust gas is then purified in catalytic converter 5 to avoid unwanted exhaust emissions. The direction of fresh air flow in air supply system 35 and the direction of exhaust gas flow in exhaust system 70 are each identified by an arrow in FIG. 1. FIG. 1 also schematically shows a cooling-water circuit 20 for cooling cylinder 55. A first temperature sensor 60 is provided in cooling-water circuit 20 for measuring the temperature of the cooling water, which simultaneously serves as a measure of the temperature in cylinder 55 and thus in internal combustion engine 1. It is referred to below as temperature $T_B$ of the internal combustion engine and is transmitted from first temperature sensor 60 to engine controller 25. According to the present invention, two glow plugs 10, 15 which heat the cooling water in cooling-water circuit 20 and are controlled by engine controller 25 are provided in cooling-water circuit 20. For this purpose, only one glow plug or even more than two glow plugs may be provided. A second temperature sensor 65 measures temperature $T_K$ of catalytic converter 5 and transmits this temperature to engine controller 25. For this purpose, second temperature sensor 65 is provided in the area of catalytic converter 5. An idle speed regulator 75 provides engine controller 25 with an idle signal LL that indicates whether or not internal combustion engine 1 is idling. If internal combustion engine 1 is idling, idle signal LL is set, otherwise it is reset. Alternatively, idle speed regulator 75 could also be implemented in engine controller 25 through hardware and/or software means. In addition, a starting device 80, which is used to start internal combustion engine 1 in the manner known to those skilled in the art, is provided and serves to send a signal SE to engine controller 25. Signal SE is an end-of-start signal that is set at the end of the starting operation and is otherwise reset. A speed sensor 85 in the area of cylinder 55 measures the rotational speed of internal combustion engine 1 and transmits the measured value to starting device 80. Based on the speed achieved by internal combustion engine 1, starting device 80 is able to determine whether the starting operation has ended and, if so, to set end-of-start signal SE or, if not, to leave it reset. The end of the start operation is detected when the speed of internal combustion engine 1 has exceeded a preset speed threshold, for example 600 revolutions per minute. Starting device 80, which essentially drives, for example, a starter-generator, may also be implemented through software and/or hardware means in engine controller 25. In the interest of clarity, the starter-generator is not illustrated in FIG. 1.

According to the present invention, the efficiency of internal combustion engine 1 is then decreased in a controlled manner at the request of engine controller 25 without influencing the running smoothness of internal combustion engine 1. The efficiency of internal combustion engine 1 is decreased by applying an additional load. In the present example, the additional load is formed by the two glow plugs 10, 15, although it could be provided as an alternative by any other connectable component that is necessary or advantageous for the function of the internal combustion engine 1, for example a fan, or a component that is not at all important for operating internal combustion engine 1, for example an air conditioner. In the description below, however, it is assumed, as shown by way of example in FIG. 1, that the additional load is formed by two glow plugs 10, 15 that are provided in cooling-water circuit 20 and are thus advantageous for operating internal combustion engine 1. Glow plugs 10, 15 are namely used to heat the cooling water in the cooling-water circuit. In principle, the use of glow plugs for quickly heating the cooling water in cooling-water circuit 20 is already known as a way to more quickly activate a heater for the interior of a vehicle.

According to the present invention, however, glow plugs 10, 15 are used primarily as an additional load to decrease the efficiency of internal combustion engine 1 with the goal of more quickly heating catalytic converter 5, the associated more rapid heating of the cooling water and thus a reduction in the heating phase for internal combustion engine 1 being viewed as a useful side effect.

Figure 2:
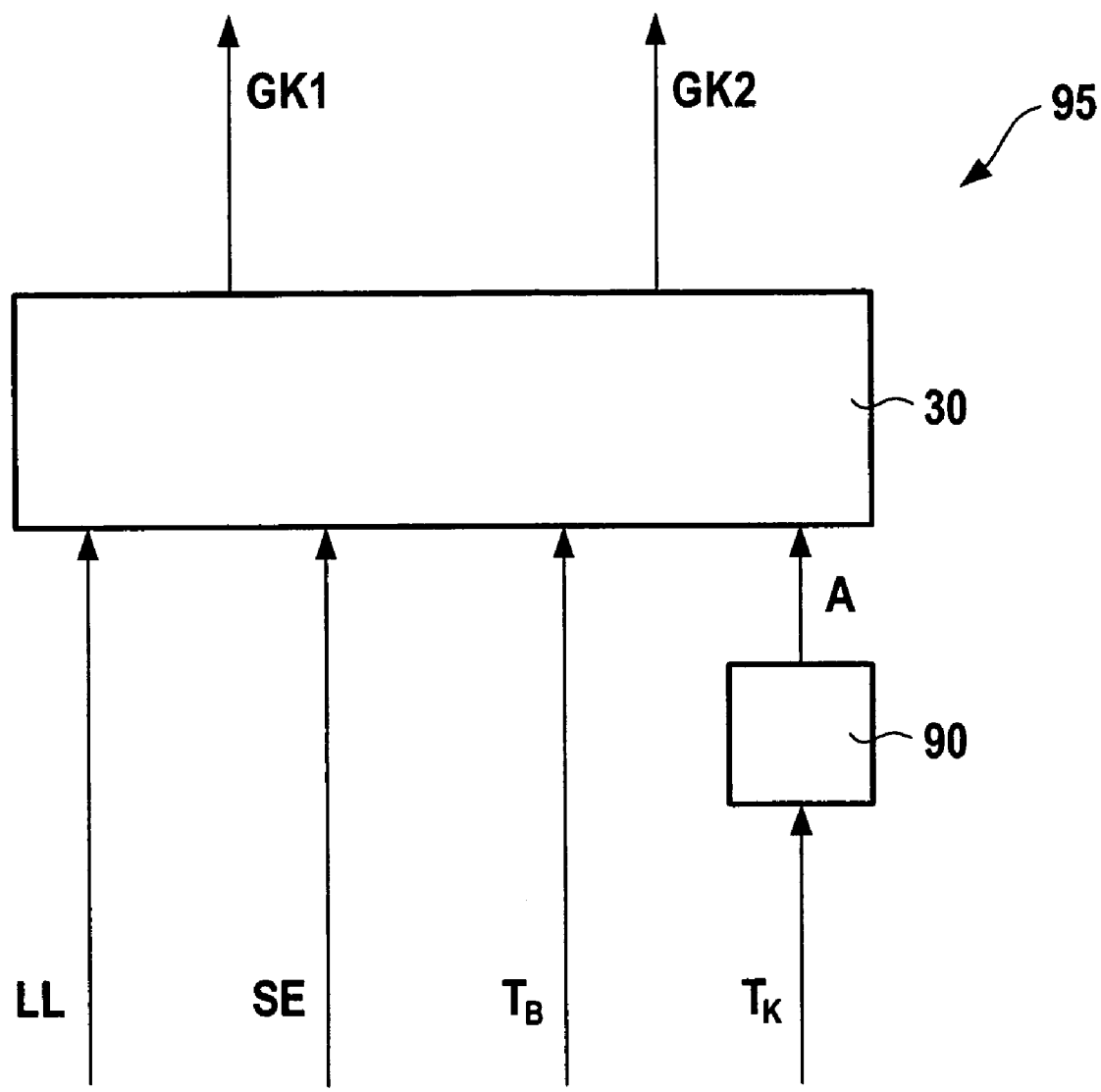
FIG. 2 shows a block diagram of a device according to the present invention.

The object of the present invention is therefore to apply an additional load in the form of the two glow plugs 10, 15 for heating catalytic converter 5. For this purpose, a device 95 is provided, which may be implemented through software and/or hardware means in engine controller 25 and is used to control the two glow plugs 10, 15 for the purpose of heating catalytic converter 5. Device 95 is illustrated in greater detail in FIG. 2 as a block diagram. Device 95 includes application means 30 to which idle signal LL, end-of-start signal SE, temperature $T_B$ of internal combustion engine 1 and a request signal A are supplied. Request signal A is generated by an analyzer unit 90 as a function of temperature $T_K$ of catalytic converter 5 supplied to analyzer unit 90. If analyzer unit 90 determines that temperature $T_K$ of catalytic converter 5 is below a first preset threshold value, it causes request signal A to be set; otherwise it causes request signal A to be reset. The first preset threshold value may be calibrated, for example, on a test bench, or it may be preset by the manufacturer of catalytic converter 5 as the operating temperature of catalytic converter 5. As a result, request signal A is set only if temperature $T_K$ of catalytic converter 5 is below the first preset threshold value, in particular below the operating temperature of catalytic converter 5 preset by the manufacturer. The first preset threshold value or the present operating temperature is selected so that catalytic converter 5 largely eliminates undesired exhaust emissions at or above this temperature. Application means 30 generates a first control signal GK1 for first glow plug 10 and a second control signal GK2 for second glow plug 15 as a function of idle signal LL, end-of-start signal SE, temperature $T_B$ of internal combustion engine 1 and request signal A. In doing so, application means 30 activates the two glow plugs 10, 15 via control signals GK1, GK2 only if it determines that request signal A has been set. Alternatively or in addition, application means 30 may optionally activate the two glow plugs 10, 15 via control signals GK1, GK2 only if temperature $T_B$ of internal combustion engine 1 is below a second preset threshold value. As a rule, temperature $T_B$ of internal combustion engine 1 correlates with temperature $T_K$ of catalytic converter 5. Therefore, if temperature $T_B$ of internal combustion engine 1 is below the second threshold value, it may be assumed that catalytic converter 5 has not yet reached its preset operating temperature. The second preset threshold value must be suitably calibrated, for example on a test bench, in such a way that catalytic converter 5 reaches its preset operating temperature at the same time when temperature $T_B$ of internal combustion engine 1 reaches the second preset threshold value. Alternatively, request signal A may be generated by analyzer unit 90 as a function of both temperature $T_K$ of catalytic converter 5 and temperature $T_B$ of internal combustion engine 1. In this case, analyzer unit 90 would set request signal A only if both temperature $T_K$ of catalytic converter 5 is below the first preset threshold value and temperature $T_B$ of internal combustion engine 1 is below the second preset threshold value. Otherwise, analyzer unit 90 would cause request signal A to be reset. In addition, application means 30 may optionally activate the two glow plugs 10, 15 via control signals GK1, GK2 only if it determines that end-of-start signal SE has been set. This ensures that glow plugs 10, 15 are activated for heating catalytic converter 5 and cooling-water circuit 20 only if a start operation of internal combustion engine 1 has ended. This prevents the application of the additional load produced by glow plugs 10, 15 from impairing or, in the worst case, terminating the start operation of internal combustion engine 1.

In addition, application means 30 may optionally activate glow plugs 10, 15 via control signals GK1, GK2 only when it determines that idle signal LL has been set. This ensures that the additional load in the form of the two glow plugs 10, 15 is applied to heat cooling-water circuit 20 and catalytic converter 4 only when internal combustion engine 1 is in an idle mode. After the engine leaves the idle mode, and idle signal LL is therefore reset, application means 30 deactivates the two glow plugs 10, 15 via control signals GK1, GK2. This ensures that internal combustion engine 1 is operable at maximum efficiency outside the idle mode, its operation being given priority over the heating of catalytic converter 5.

The two glow plugs 10, 15 are activatable by application means 30 via control signals GK1, GK2 either synchronously, i.e., more or less simultaneously, or sequentially. Activating the two glow plugs 10, 15 sequentially avoids abruptly loading the vehicle electrical system, and prevents it from failing. Alternatively, it is possible, as described above, to provide only one glow plug as the additional load for heating catalytic converter 5 and cooling-water circuit 20 or to provide more than two glow plugs for heating catalytic converter 5 and cooling-water circuit 20, and to also activate them synchronously or sequentially.

Activating glow plugs 10, 15 for heating cooling-water circuit 20 requires the internal combustion engine to provide more torque or greater power, due to the necessary additional electrical load on the generator, requiring engine controller 25 to open throttle valve 40 wider to keep internal combustion engine 1 at the speed needed to heat catalytic converter 5 despite additionally activated glow plugs 10, 15. The speed needed to heat catalytic converter 5 is equivalent to an elevated idle speed mentioned above under "Background Information" with the goal of increasing the exhaust gas mass flow rate in exhaust system 70 and thus increasing the transfer of heat to exhaust system 70 and raising the temperature of catalytic converter 5. If throttle valve 40 opens wider, due to the activated additional load in the form of the two glow plugs 10, 15, the exhaust gas mass flow rate in exhaust system 70 also increases, which further increases the amount of heat in exhaust system 70 and thus further boosts the transfer of heat to catalytic converter 5. As a result, the application of the additional load causes catalytic converter 5 to heat more quickly than would be the case solely by setting a higher idle speed. As a side effect, the heat transferred to the cooling water by glow plugs 10, 15 brings up internal combustion engine 1 more quickly to its operating temperature and thus reduces fuel consumption during later startup of the vehicle, which in this example is propelled by internal combustion engine 1.

Glow plugs 10, 15 are deactivatable by application means 30 setting control signals GK1, GK2 as described above when one of the conditions needed to activate glow plugs 10, 15 is no longer met, for example, when internal combustion engine 1 leaves the idle mode and idle signal LL is reset. In this case, i.e., when the engine leaves the idle mode, deactivating glow plugs 10, 15 may make enough torque reserves or power reserves of internal combustion engine 1 available to start up the vehicle. Device 95 described above may be used to activate glow plugs 10, 15 in a new operating state and by setting idle signal LL in the manner described above as a function of temperature $T_K$ of the catalytic converter and, in addition, optionally as a function of temperature $T_B$ of internal combustion engine 1 to help maintain the temperature of catalytic converter 5 during operation of the internal combustion engine. In this case, end-of-start signal SE is naturally reset because internal combustion engine 1 has already been started successfully and was not shut down again.

Figure 3:
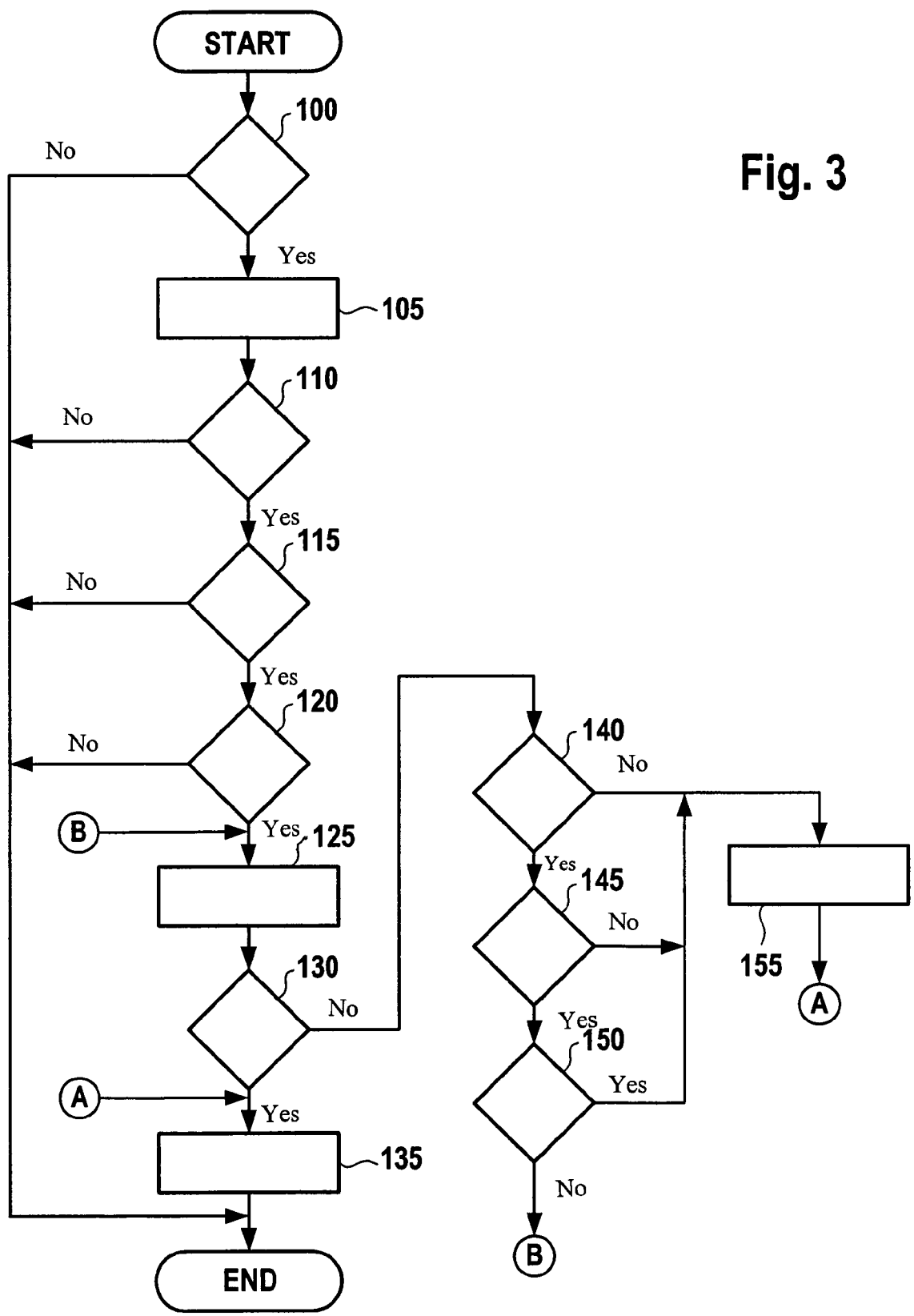
FIG. 3 shows a flow chart illustrating the method according to the present invention.

FIG. 3 shows a flow chart for an exemplary sequence of the method according to the present invention. After the program begins, analyzer unit 90 checks at a program point 100 whether temperature $T_K$ is below the first preset threshold value. If this is the case, the program branches to a program point 105; if not, the program is terminated.

At program point 105, analyzer unit 90 sets request signal A, unless this request signal A was already set earlier. The program then branches to a program point 110.

At program point 110, application means 30 checks whether temperature $T_B$ of internal combustion engine 1 is below the second preset threshold value. If this is the case, the program branches to a program point 115; otherwise the program is terminated.

At program point 115, application means 30 checks whether end-of-start signal SE has been set. If this is the case, the program branches to a program point 120; otherwise, the program is terminated.

At program point 120, application means 30 checks whether idle signal LL has been set. If this is the case, the program branches to a program point 125; otherwise, the program is terminated.

At program point 125, application means 30 activates glow plugs 10, 15 by generating control signals GK1, GK2. The program then branches to a program point 130.

At program point 130, application means 30 checks whether idle signal LL has been reset. If this is the case, the program branches to a program point 135; otherwise, it branches to a program point 140.

At program point 135, application means 30 deactivates both glow plugs 10, 15 by generating control signals GK1, GK2, thus removing the additional load formed by glow plugs 10, 15. The program is then terminated.

At program point 140, analyzer unit 90 checks whether temperature $T_K$ of catalytic converter 5 is below the first preset threshold value. If this is the case, the program branches to a program point 145; otherwise, it branches to a program point 155.

At program point 155, analyzer unit 90 resets request signal A. The program then branches to program point 135.

At program point 145, application means 30 checks whether temperature $T_B$ of internal combustion engine 1 is below the second preset threshold value. If this is the case, the program branches to a program point 150; otherwise, it branches to program point 155.

At program point 150, application means 30 checks whether end-of-start signal SE has been reset or whether internal combustion engine 1 was shut down. If this is the case, the program branches to program point 155; otherwise it branches to program point 125 and glow plugs 10, 15 remain activated.

What is claimed is:

1. A method for operating an internal combustion engine including a catalytic converter, the method comprising:
    applying an additional load of the internal combustion engine to heat the catalytic converter;
    wherein the additional load includes at least one glow plug that is introduced into a cooling-water circuit of the internal combustion engine; and wherein the at least one glow plug includes multiple glow plugs, and the multiple glow plugs are activated sequentially.

2. An internal combustion engine sub-system, comprising:
    a catalytic converter; and
    an additional load of the internal combustion engine configured to heat the catalytic converter;
    wherein the additional load includes multiple glow plugs that are introduced into a cooling-water circuit of the internal combustion engine, and wherein the multiple glow plugs are activated sequentially.

* * * * *